(12) United States Patent
Northcott et al.

(10) Patent No.: US 10,502,879 B1
(45) Date of Patent: Dec. 10, 2019

(54) SYSTEMS WITH COLORED INFRARED-TRANSPARENT LAYERS

(71) Applicant: Apple Inc., Cupertino, CA (US)

(72) Inventors: Malcolm J. Northcott, Santa Cruz, CA (US); Arthur Y. Zhang, San Jose, CA (US); Bradford J. Zercoe, Danville, CA (US); Matthew E. Last, San Jose, CA (US); Jack E. Graves, Sunnyvale, CA (US); Irene Perali, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 15/703,846

(22) Filed: Sep. 13, 2017

Related U.S. Application Data (60) Provisional application No. 62/397,452, filed on Sep. 21, 2016.

(51) Int. Cl.
| | | |
|---|---|---|
| *G02B 5/20* | (2006.01) | |
| *G02B 5/28* | (2006.01) | |
| *G02B 5/26* | (2006.01) | |
| *G02B 1/10* | (2015.01) | |
| *G02B 1/115* | (2015.01) | |
| *B22F 1/00* | (2006.01) | |
| *G01V 8/10* | (2006.01) | |

(52) U.S. Cl.
CPC ............ *G02B 5/208* (2013.01); *B22F 1/0018* (2013.01); *G01V 8/10* (2013.01); *G02B 1/10* (2013.01); *G02B 1/115* (2013.01); *G02B 5/26* (2013.01); *G02B 5/281* (2013.01)

(58) Field of Classification Search
CPC .......... G02B 5/208; G02B 5/26; G02B 5/281; G02B 1/10; G02B 1/115; G01V 8/10; B22F 1/0018
See application file for complete search history.

(56) References Cited

U.S. PATENT DOCUMENTS

| | | |
|---|---|---|
| 7,371,457 B2 | 5/2008 | Oldenburg et al. |
| 8,511,814 B2 | 8/2013 | Oyanagi et al. |
| 2005/0074611 A1 | 4/2005 | Kuehnle et al. |
| 2010/0203454 A1 | 8/2010 | Brongersma et al. |
| 2010/0253594 A1* | 10/2010 | Szczerba ............... G01S 13/723 345/7 |

(Continued)

*Primary Examiner* — Anner N Holder
(74) *Attorney, Agent, or Firm* — Treyz Law Group, P.C.; G. Victor Treyz; Michael H. Lyons (57) ABSTRACT

A system such as a vehicle system, building, or electrical equipment may be provided with one or more optical components. The optical components may include a near-infrared camera or other components that operate at near-infrared wavelengths. A visible-light-reflecting-and-infrared-light-transmitting layer may overlap the optical component. The visible-light-reflecting-and-infrared-light-transmitting layer may have an infrared-transparent substrate. A polymer layer may be formed on the substrate and may contain plasmonic nanoparticles that reflect white light. Colorant may be incorporated into the polymer layer or into an additional polymer coating to impart a desired color to the reflected white light and thereby provide the visible-light-reflecting-and-infrared-light-transmitting layer with a desired appearance.

20 Claims, 9 Drawing Sheets

(56) References Cited

U.S. PATENT DOCUMENTS

| | | | | |
|---|---|---|---|---|
| 2012/0273662 A1* | 11/2012 | Caldwell | .............. | G01N 21/658 250/214.1 |
| 2013/0048837 A1* | 2/2013 | Pope | .................... | G01J 1/0422 250/214.1 |
| 2013/0168228 A1 | 7/2013 | Ozin et al. | | |
| 2015/0116856 A1* | 4/2015 | Lee | ........................ | G02B 5/206 359/891 |
| 2015/0301400 A1* | 10/2015 | Kimura | ............. | G02F 1/133512 349/43 |
| 2017/0292830 A1* | 10/2017 | Ament | ................... | B82Y 10/00 |
| 2019/0195805 A1* | 6/2019 | Zheng | ................. | G01N 21/658 |

\* cited by examiner

SYSTEMS WITH COLORED INFRARED-TRANSPARENT LAYERS

This application claims the benefit of provisional patent application No. 62/397,452, filed on Sep. 21, 2016, which is hereby incorporated by reference herein in its entirety.

FIELD

This relates generally to infrared-transparent structures, and, more particularly, to systems having colored infrared-transparent layers.

BACKGROUND

In vehicles, building systems, portable electronic devices, and other systems, it is often desirable to provide structures that modify the propagation of light. For example, it may sometimes be desirable to provide these systems with layers that block visible light while transmitting infrared light.

It can be challenging to incorporate infrared-transparent structures such as these into systems. If care is not taken, structures that are infrared-transparent will have an undesirable appearance.

SUMMARY

A system such as a vehicle system, building, or electrical equipment may be provided with one or more optical components. The optical components may include a near-infrared camera or other components that operate at near-infrared wavelengths. A visible-light-reflecting-and-infrared-light-transmitting layer may overlap an infrared optical component. Visible light may be blocked by this layer while infrared light that is emitted or detected by the infrared optical component may pass through the layer.

The visible-light-reflecting-and-infrared-light-transmitting layer may have an infrared-transparent substrate or other support structure that transmits infrared light. A polymer layer may be formed on the substrate. The polymer layer may contain plasmonic nanoparticles that reflect white light. Colorant such as colored dye or pigment may be incorporated into the polymer layer or into an additional polymer coating to impart a desired color to the reflected white light and thereby provide the visible-light-reflecting-and-infrared-light-transmitting layer with a desired appearance. Configurations in which a substrate layer or other structural support structure includes plasmonic nanoparticles and colorant may also be used.

Plasmonic nanoparticles in the visible-light-reflecting-and-infrared-light-transmitting layer may include solid metal nanoparticles and metal-coated-dielectric-core nanoparticles. Nanoparticle dimensions may be varied to adjust the absorption and scattering spectrums of the nanoparticles. Nanoparticles of several different types may be incorporated into a visible-light-reflecting-and-infrared-light-transmitting layer to supply the layer with the ability to reflect white light. This allows non-black colorant to be used in coloring the visible-light-reflecting-and-infrared-light-transmitting layer.

DETAILED DESCRIPTION

A system may have infrared optical components. Visible-light-reflecting-and-infrared-light-transmitting layers may cover infrared optical components to protect the infrared optical components and to hide the infrared optical components from view.

Figure 1:
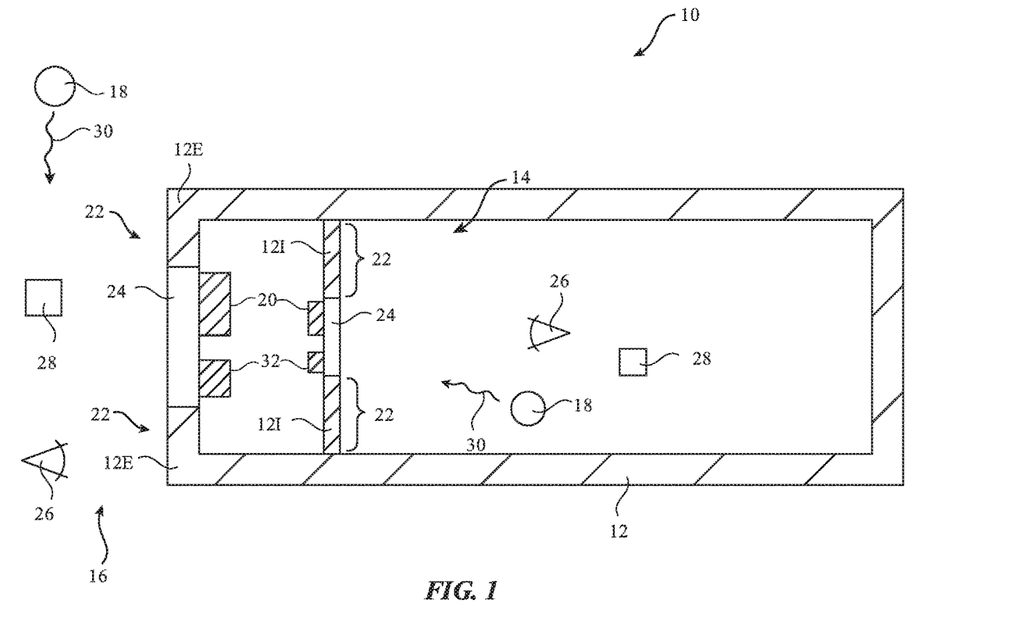
FIG. 1 is a diagram of an illustrative system in accordance with an embodiment.

FIG. 1 is a diagram of an illustrative system that may include an infrared-transparent layer that blocks visible light. System 10 of FIG. 1 may be a building, a vehicle, electronic equipment such as a cellular telephone, laptop computer, or other portable electronic device, or other suitable system that includes electrical components. Some of the electrical components may be light-based components (sometimes referred to as optical components) that operate using infrared light. As an example, system 10 may include one or more infrared optical components such as components 20.

Components 20 may be mounted in alignment with structures that are transparent to infrared light such as infrared-light-transparent layers (structures) 24. Layers 24 may be fully or partially opaque at visible light wavelengths and may therefore sometimes be referred to as visible-light-blocking layers or visible-light-reflecting layers. For example, when viewed by a user of system 10 at visible light wavelengths, layers 24 may be black or may be white or have other non-black colors (e.g., blue, green, red, silver, yellow, gold, or other non-black colors).

System 10 may have support structures such as support structures 12. In a vehicle, support structures 12 may form portions of a vehicle dashboard, exterior portions of a vehicle body, or portions of a vehicle window (as examples). In other systems, support structures 12 may form walls in an electronic device or building.

Infrared-transparent layers 24 may be mounted in openings in structures 12. Infrared components such as components 20 may be mounted behind infrared transparent layers 24 so that components 20 are overlapped by layers 24 and therefore are protected by layers 24.

Structures 12 may be configured to completely or partly surround an interior region such as interior region 14 and may separate interior region 14 from exterior region 16. Viewers 26 may view layers 24. Viewers 26 may include viewers that are located in interior region 14 (e.g., viewers 26 may include vehicle occupants when system 10 is a vehicle) and may include viewers that are located in exterior region 16 (e.g., viewers 26 may include external observers).

Layer 24 and surrounding portions of system 10 may be illuminated by interior and exterior light sources 18. Light sources 18 may include light-emitting diodes, lamps, the sun, and other sources of light. Light 30 that is emitted by one or more of light sources 18 may include visible and infrared light.

Infrared-transparent layer 24 may be mounted in structures 12 so that portions of structures 12 are adjacent to layer 24. For example, portions 12I of structures 12 in interior 14 may be adjacent to layer 24 in interior 14 and portions 12E on the exterior of structures 12 may lie adjacent to layer 24 on the exterior surface of structures 12. To enhance visual aesthetics, it may be desirable for the appearance of layers 24 to match the appearance of adjacent portions of system 10 such as portions 22 (e.g. it may be desirable for layers 24 and portions 22 to be color matched).

Portions (structures) 22 (e.g., external body structures and/or internal body structures in a vehicle) may sometimes be referred to as fascias, body structures, etc. Interior body structures in a vehicle (e.g., structures 12I) may form portions of a vehicle dashboard or other mounting structures for layer 24. Exterior body structures in a vehicle (e.g., structures 12E) may form portions of a vehicle bumper, front, side, rear, or roof body panel or may form a portion of a window (e.g., a window structure that is covered with a colored ink or other opaque layer). As an example, in interior 14, structures 22 may be vehicle dashboard structures or other vehicle interior structures and, in exterior 16, structures 22 may form a portion of a bumper or other body part in a vehicle body. Structures 22 may also form part of a display in an electronic device such as a cellular telephone or computer (e.g., a glass display cover layer that is coated with opaque ink or other opaque masking material), may form part of a window, or may form other structures for mounting layers 24.

Structures 22 may be formed from plastic, glass, metal, wood, fabric, other materials, or combinations of these materials. Structures 22 may be visually opaque and may have a variety of different colors. As an example, structures 22 may be black, silver, gray, white, blue, green, red, yellow, or may have other colors. To visually coordinate the appearance of structures 22 and layers 24, it may be desirable for layers 24 to be at least partially opaque at visible wavelengths (e.g., it may be desirable for layers 24 to reflect and block at least 50%, at least 70%, at least 90%, at least 95%, or other suitable amount of visible light from 400-700 nm).

As an example, structures 22 may have a blue appearance and layers 24 may have a blue color or other appearance that is color coordinated with the appearance of structures 22. To adjust the color of layers 24 to have a desired visual appearance when viewed by interior and exterior viewers 26, layers 24 may include one or more materials absorb and reflect (scatter) visible light. For example, layers 24 may include a polymer or other material with particles that reflect visible light while transmitting infrared light and may include dyes, pigments, or other colorants that are transparent at infrared wavelengths and that impart a desired color to visible light that is scattered or otherwise reflected towards the viewer.

To provide layers 24 with satisfactory visible light scattering and absorption while ensuring satisfactory infrared transparency, it may be desirable to incorporate resonant scatterers such as plasmonic nanoparticles into layers 24. The plasmonic nanoparticles can be configured to exhibit high visible light scattering and high infrared transparency, so that infrared light can reach optical components 20 that sense infrared light with low absorbance and low wavefront distortion. The high transparency of the plasmonic nanoparticles may also allow components 20 that emit infrared light to avoid undesired infrared light absorption in layers 24.

Dyes, pigments, and other materials and structures in layers 24 may be configured to exhibit desired colors for viewers 26 when illuminated by light 30. If, for example, it is desired for layers 24 to exhibit a blue color, a blue dye or blue pigment may be incorporate into layers 24 in addition to the plasmonic nanoparticles to produce a desired blue appearance. Particularly when layers 24 have lighter colors (white, silver, gold, red, green, blue, or other non-black colors), it may be desirable for at least a portion of layers 24 to reflect at least 20%, at least 50%, at least 70%, or other suitable amount of visible light at wavelengths of 400-700 nm, while blocking at least 20%, at least 50%, at least 70%, at least 80%, at least 90%, at least 95%, etc. of visible light at 400-700 nm. The ability to block visible light allows layers 24 to hide components behind layers 24 such as components 20 from view. The ability to reflect visible light from layers 24 may allow layers 24 to be colored as desired (e.g., the ability of plasmonic nanoparticles in layers 24 to scatter visible light back towards a viewer allows layers 24 to have a light non-black color such as blue, red, green, yellow, gold, white, etc.).

At the same time, satisfactory performance of infrared-light components 20 can be ensured by configuring the plasmonic nanoparticles and other materials in infrared-transparent layers 24 to exhibit substantial transparency at infrared light wavelengths. Layers 24 may, for example, exhibit transparency values of greater than 50%, greater than 70%, greater than 80%, greater than 90%, greater than 95%, less than 99.99%, or other suitable values at near infrared wavelengths (e.g., wavelengths above 800 nm, from 800-2500 nm, less than 3000 nm, 900-1000 nm, etc.).

If desired, more than one electrical component may be mounded under (behind) each infrared-transparent layer 24. As shown in FIG. 1, for example, one or more components 32 may be mounted behind layers 24 in addition to infrared components 20. Components 32 may include capacitive touch sensors, force sensors, temperature sensors, antennas or other wireless circuits, and/or other electrical components.

Infrared components 20 may be any suitable components that operate at infrared wavelengths. As an example, components 20 may include infrared proximity sensors. Infrared proximity sensors may include a light source such as an infrared light-emitting diode or infrared laser that emits infrared light and a corresponding infrared-light detector (e.g., a silicon photodetector) that measures reflections of the emitted infrared light from nearby objects such as objects 28. Components 20 may also include lidar sensors. Lidar sensors, which may sometimes be referred to as light detection and ranging sensors or laser radar sensors, may have lasers that emit beams of infrared light, scanning systems that scan the emitted beams, and infrared light detectors that detect reflections of the emitted infrared light from objects 28. If desired, components 20 may include infrared cameras, light sources that emit infrared light (e.g., arrays of infrared light-emitting diodes and/or infrared lasers that emit light for an infrared cameras), and/or other infrared components.

Figure 2:
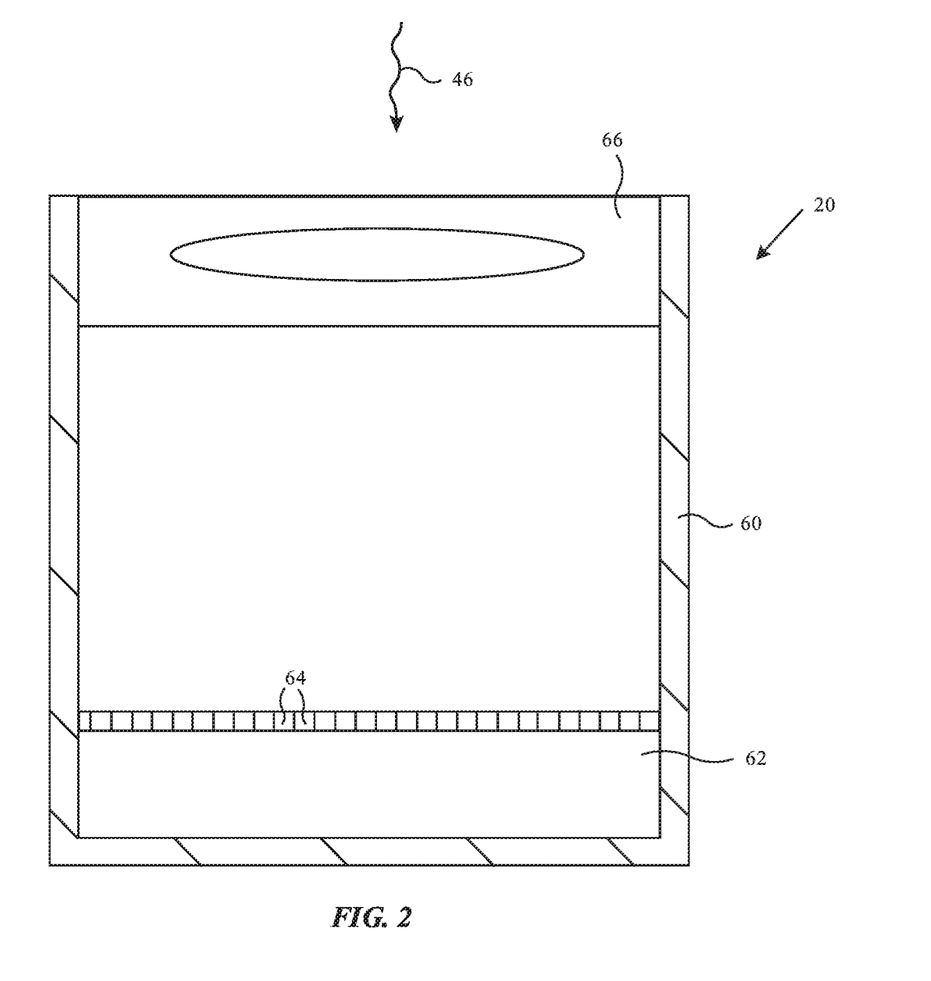
FIG. 2 is a cross-sectional side view of an illustrative optical component such as an infrared camera in accordance with an embodiment.

FIG. 2 is a cross-sectional side view of infrared component 20 in an illustrative configuration in which component 20 is an infrared camera. As shown in FIG. 2, camera (component) 20 may include a housing such as housing 60.

Infrared image sensor 62 may be formed from a silicon die having an array of image sensor pixels 64 (e.g., pixels with silicon photodetectors or other infrared-sensitive light detectors) or other digital infrared image sensor. A lens such as lens 66 may include one or more infrared-transparent lens elements and may be used to focus incoming infrared light 46 so that sensor 62 may capture images of objects 28. Infrared components 20 may operate at near infrared wavelengths (e.g., wavelengths of 800-2500 nm, 800 nm or more, 940 nm, 900-1000 nm, 800-1000 nm, below 1000 nm, below 2000 nm, below 2500 nm, or other suitable near infrared wavelengths).

Figure 3:
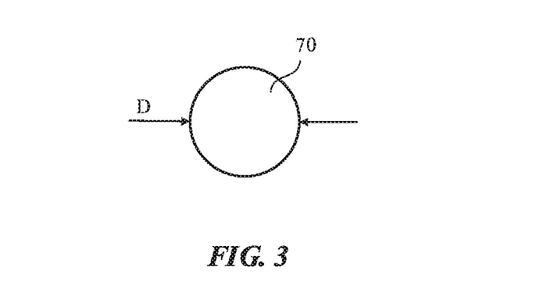
FIG. 3 is a cross-sectional side view of an illustrative plasmonic particle formed from a solid material in accordance with an embodiment.

Plasmonic nanoparticles may be formed from conductive materials such as metal. An illustrative solid nanoparticle is shown in FIG. 3. Nanoparticle 70 of FIG. 3 has a spherical shape. If desired, nanoparticles 70 may have other shapes (e.g. nanoplates). Nanoparticles 70 may be formed from silver, gold, or other metal. The size (e.g., diameter D of spherical plasmonic nanoparticle 70 of FIG. 3) may be 20-200 nm, more than 10 nm, less than 250 nm, less than 300 nm, or other suitable diameter. Nanoparticle size affects the wavelengths of light that are scattered and absorbed by the nanoparticles, so adjustments to the diameter D of nanoparticle 70 can be used to produce desired light-scattering and absorption spectrums.

Figure 4:
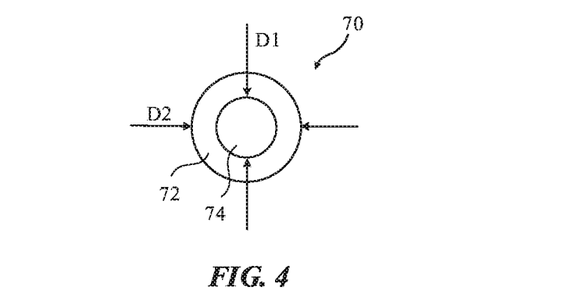
FIG. 4 is a cross-sectional side view of an illustrative plasmonic particle formed from a metal coating on a dielectric core in accordance with an embodiment.

If desired, plasmonic nanoparticles may have dielectric cores surrounded by conductive coatings. As shown in FIG. 4, for example, plasmonic nanoparticle 70 may have a core 74 that is formed from a dielectric such as silica and may have a coating layer such as shell 72 that is formed from a metal (e.g., a silver or gold coating layer, etc.). The diameter D1 of core 72 and the diameter D2 of nanoparticle 70 may be adjusted to adjust the reflectivity and absorption spectrums of particle 70.

Figure 5:
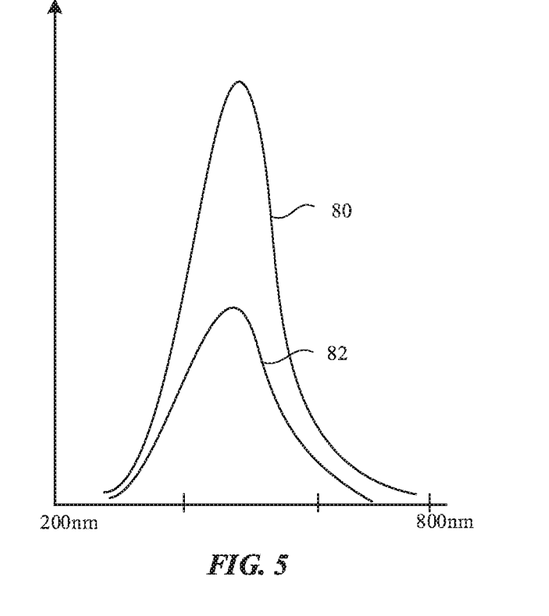
FIG. 5 is a graph showing illustrative scattering and absorption spectrums for a plasmonic particle of the type shown in FIG. 3 in accordance with an embodiment.

FIG. 5 shows an illustrative scattering spectrum (curve 80) and illustrative absorption spectrum (curve 82) for solid nanoparticles (e.g., solid metal nanoparticles) of the type shown in FIG. 3. The shapes of curves 80 and 82 (e.g., the wavelengths associated with the peaks of curves 80 and 82) may be selected by adjusting nanoparticle diameter D.

Figure 6:
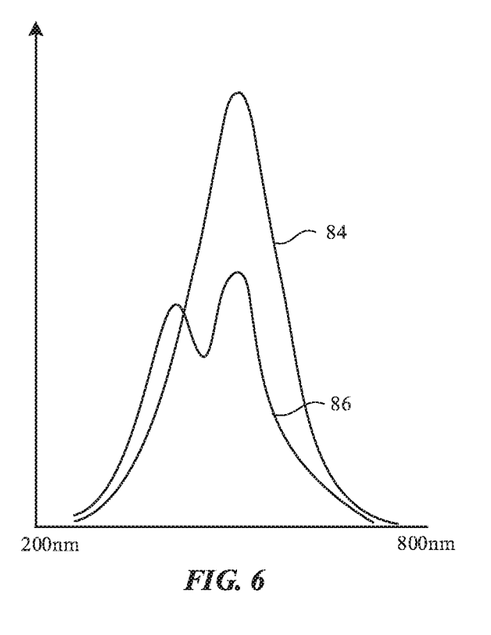
FIGS. 6 and 7 are graphs showing illustrative scattering and absorption spectrums for plasmonic particles of the type shown in FIG. 4 in accordance with an embodiment.
Figure 7:
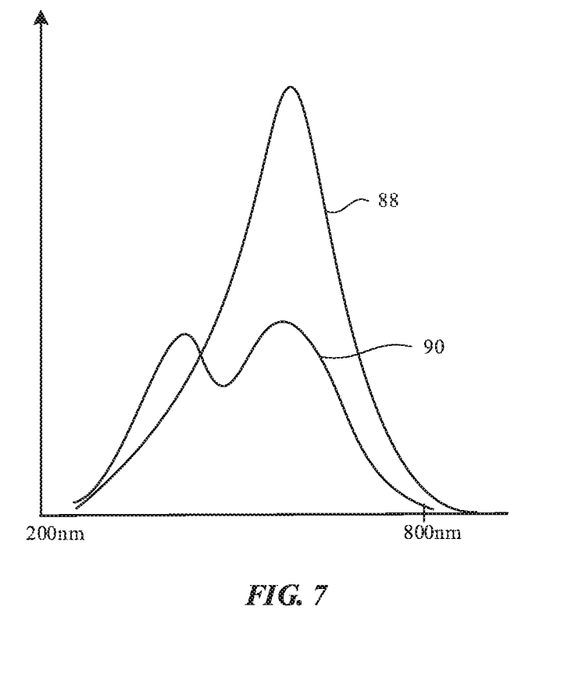

FIG. 6 shows an illustrative scattering spectrum (curve 84) and illustrative absorption spectrum (curve 86) for a dielectric-core nanoparticle of the type shown in FIG. 3. The shapes of curves 84 and 86 may be adjusted by adjusting the values of D1 and D2 of FIG. 4. For example, if D2 is maintained constant and D2 is increased, the scattering spectrum represented by curve 84 in FIG. 6 may shift to longer wavelengths and the absorption spectrum represented by curve 86 may shift to longer wavelengths, as illustrated by scattering curve (spectrum) 88 and absorption curve (spectrum 90), respectively, of FIG. 7.

Figure 8:
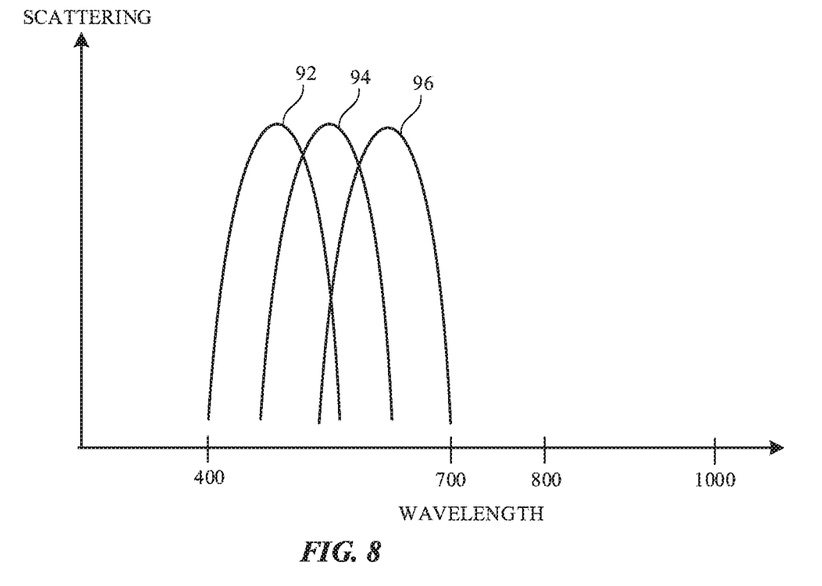
FIG. 8 is a graph showing how an infrared-transparent layer may incorporate plasmonic particles with different scattering spectrums in accordance with an embodiment.

To create a desired light-scattering spectrum for layers 24, layers 24 may include multiple different types of plasmonic nanoparticles, each with a different respective light scattering spectrum and light absorption spectrum. Consider, as an example, a scenario in which layers 24 are provide with a polymer layer that includes three types of plasmonic nanoparticles. The polymer layer may, for example, include a first type of plasmonic nanoparticle (e.g., solid particle 70 of FIG. 3) that exhibits light scattering spectrum 92 of FIG. 8, a second type of plasmonic nanoparticle (e.g., metal-coated-dielectric-core nanoparticle 70 of FIG. 4) that exhibits light scattering spectrum 94, and a third type of plasmonic nanoparticle (e.g., a particle of the type shown in FIG. 4, but having a thinner shell 72 than the second type of plasmonic nanoparticle) that exhibits light scattering spectrum 96. The first type of nanoparticle may primarily scatter blue light, the second nanoparticle may primarily scatter green light, and the third nanoparticle may primarily scatter red light. Taken together, the first, second, and third nanoparticles may scatter light over substantially all of the visible light spectrum (400-700 nm) so that the polymer layer that includes the first, second, and third plasmonic nanoparticles will scatter white light and appear white and visually opaque, thereby hiding underlying optical components 20 from view.

If desired, dye, pigment, or other colorant may be added to layer 24 so that reflected white light from the plasmonic nanoparticles acquires a desired color (e.g., blue, red, green, other non-black colors, etc.). The relatively large amount of white light that is scattered by the first, second, and third plasmonic nanoparticles may be use to provide layers 24 with a desired light and colorful (non-black) appearance. There are three different types of plasmonic nanoparticles in layer 24 in the example of FIG. 8. If desired, fewer different types of plasmonic nanoparticles or more different types of plasmonic nanoparticles may be used. For example, a polymer layer or other layer with plasmonic nanoparticles in layer 24 may be provide with two different types of plasmonic nanoparticles or four or more different types of plasmonic nanoparticles. Moreover, the spectrums associated with the plasmonic nanoparticles may, if desired, be selected to provide layer 24 with a desired non-black color and/or to accentuate a particular color of layer 24 that is being provided by a colorant such as a dye or pigment.

Figure 9:
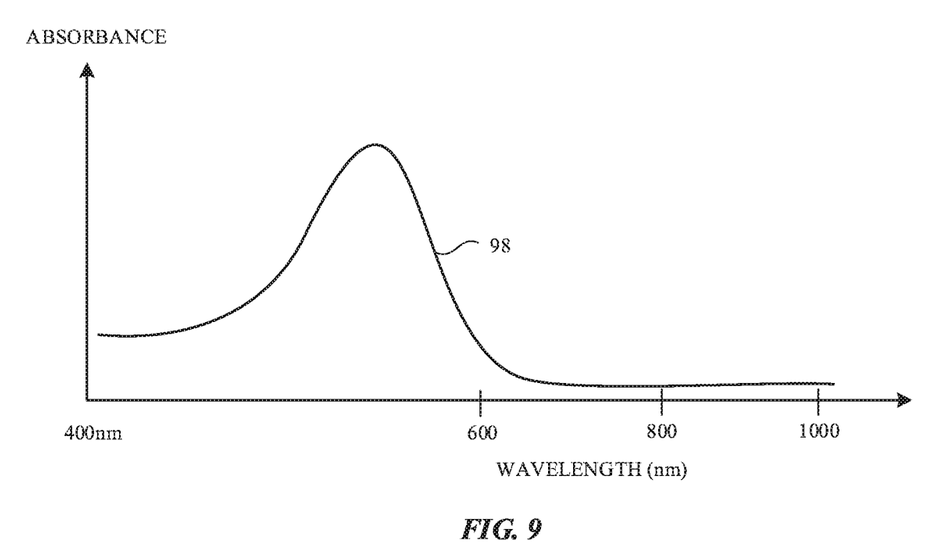
FIG. 9 is a graph showing an absorption spectrum for an illustrative colorant such as a dye or pigment in accordance with an embodiment.

An illustrative absorption spectrum 98 for a colorant (e.g., a dye or pigment contained in a polymer in layer 24) is shown in FIG. 9. In the example of FIG. 9, absorption spectrum 98 peaks at green wavelengths, so that light scattered from layer 24 has a reddish appearance. Other colors of dyes or pigments may be used, if desired. Dyes, pigments, and other colorants may be used to color layer 24 or part of layer 24 with any suitable color (e.g., blue, green, red, yellow, etc.).

Figure 10:
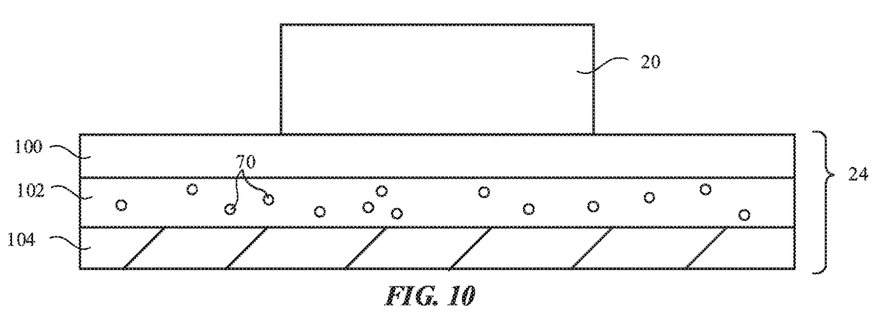
FIGS. 10, 11, and 12 are cross-sectional side views of illustrative visible-light-reflecting-and-infrared-light-transmitting layers in accordance with embodiments.
Figure 11:
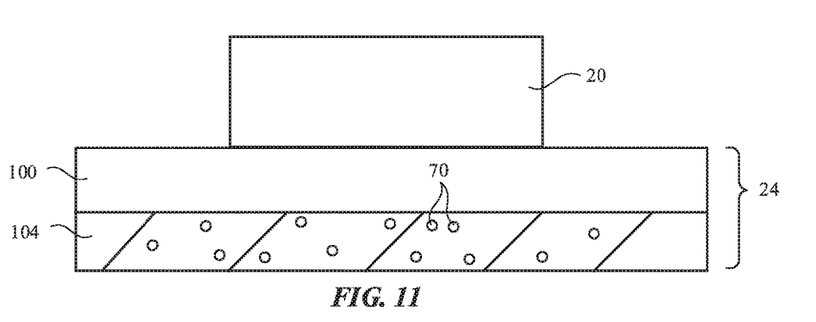
Figure 12:
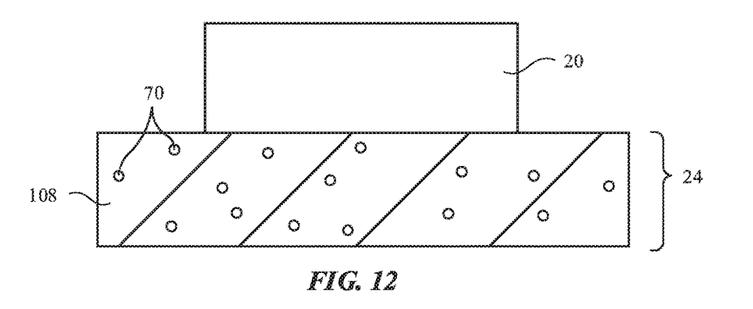

FIGS. 10, 11, and 12 show illustrative configurations that may be used for forming layer 24. Layer 24, which may sometimes be referred to as a visible-light-blocking-and-infrared-light-transmitting layer or a visible-light-reflecting-and-infrared-light-transmitting layer, may be configured to pass infrared light while blocking and reflecting (scattering) visible light.

As shown in FIGS. 10, 11, and 12, layer 24 may be supported in support structure 12 (e.g., structures 22 of FIG. 1 or other structures in device 10) so that layer 24 overlaps optical component 20. Component 20 may be an infrared-light-emitting component (e.g., an illumination source formed from light-emitting diodes, lasers, or other devices that provides infrared illumination for a component such as an infrared camera or a light-emitting diode or an infrared laser or other light-emitting device in an infrared proximity sensor or lidar device) and/or may be a light-detecting component (e.g., a two-dimensional infrared image sensor such as image sensor 62 of FIG. 2, a silicon photodetector or other photodetector in an infrared proximity sensor or lidar device, or other light sensing component). During operation, infrared light associated with component 20 may pass through layer 24. For example, component 20 may emit infrared light that passes through layer 24 and/or component 20 may receive infrared light that passes through layer 24. In addition to transmitting infrared light, layer 24 may include plasmonic nanoparticles and other materials to provide layer 24 with desired visible light-blocking properties and a desired appearance (e.g., a desired color).

For satisfactory visible light blocking, layer 24 may block at least 30%, at least 50%, at least 70%, at least 90%, or at least 95%, or less than 99.9% of visible light at wavelengths 400-700 nm. For satisfactory infrared light transmission, layer 24 may transmit at least 50%, at least 70%, at least 80%, at least 90%, at least 95%, at least 98%, or less than 99.99% of infrared light at wavelengths of 900-1000 nm or other near infrared wavelengths.

Layer 24 may include one or more support structures such as structural layer 100 of FIG. 10. Layer 100 may be a glass, ceramic, or plastic substrate layer or other layer of material that is transparent to infrared light. As an example, layer 100 may be formed from a polymer such as polycarbonate. Other polymers, glasses, ceramics, or other materials may be used in forming a structural support layer for layer 24, if desired.

Layer 100 may be coated by coating layer 102. Coating layer 102 may be include plasmonic nanoparticles 70. With one illustrative configuration, coating layer 102 may be formed from a cured liquid polymer. In liquid form, layer 102 may include plasmonic nanoparticles 70. When cured to form layer 102 of FIG. 10, the embedded nanoparticles can help scatter light, as described in connection with FIG. 8. If desired, layer 102 may be formed form multiple sublayers (e.g., multiple polymer layers each of which includes a different type of plasmonic nanoparticle, etc.), may be formed from molded thermoplastic resins, and/or may be formed from other suitable materials that serve as an infrared-transparent binder for plasmonic nanoparticles 70.

Coating layer 104 of FIG. 10 may be formed on top of layer 102 to provide layer 24 with a desired color. For example, coating layer 104 may include a colorant such as dye and/or pigment so that light that travels through coating layer 104 and that reflects (scatters) off of the plasmonic particles 70 of layer 102 may acquire a desired color. Coating layer 104 may, as an example, include a blue colorant in configurations in which layer 104 is being color matched to an adjacent blue structure in system 10 (see, e.g., adjacent structures 22 of FIG. 1). In general, any suitable color of colorant may be incorporated into layer 104 (e.g., red colorant, green colorant, blue colorant, yellow colorant, etc.).

The visible light reflection (scattering) from plasmonic nanoparticles 70 can ensure that sufficient light passes through coating 104 to provide layer 24 with a desired appearance. For example, multiple different types of plasmonic nanoparticles or other suitable nanoparticles 70 may be incorporated into layer 102 to provide layer 102 with the ability to reflect white light. Layer 104 may be formed from a polymer that includes blue dye. With this configuration, the visible light that passes through layer 104 to layer 102 and the visible light that is reflected from layer 104 toward the viewer may acquire a desired blue color. The use of plasmonic nanoparticles in layer 102 to scatter white light may help ensure that the apparent color of layer 24 is not too dark (e.g., red, green, blue, yellow, and other non-black colors can be presented to a viewer).

FIG. 11 shows how plasmonic nanoparticles 70 may be incorporated into layer 104. In this type of arrangement, plasmonic nanoparticles 70 may scatter white light and a colorant such as a dye or pigment in layer 104 may provide layer 24 with a desired color. For example, plasmonic nanoparticles 70 may include three different types of plasmonic nanoparticles or other suitable number of plasmonic nanoparticles to reflect white light, as described in connection with curves 92, 94, and 96 of FIG. 8 and a blue dye or pigment may be included in layer 104 to provide layers 24 with a desired blue color.

FIG. 12 shows how plasmonic nanoparticles 70 and colorant such as dye or pigment may be incorporated into structural layer 108. In this configuration, structural layer 108 may be, for example, a polymer structure (e.g., a polymer substrate), plasmonic nanoparticles 70 may be embedded in some or all of the polymer of layer 108, and colorant such as dye or pigment (e.g., non-black dye or pigment) may be incorporated into layer 108.

The foregoing is merely illustrative and various modifications can be made to the described embodiments. The foregoing embodiments may be implemented individually or in any combination.

What is claimed is:

1. A system, comprising:
   an infrared optical component; and
   a visible-light-reflecting-and-infrared-light-transmitting layer that overlaps the infrared optical component and that includes:
      a substrate layer;
      a first coating on the substrate layer that is formed from a polymer containing plasmonic nanoparticles; and
      a second coating on the first coating,
   wherein the plasmonic nanoparticles include at least first and second plasmonic nanoparticles with first and second distinct light-scattering spectrums.

2. The system defined in claim 1 wherein the plasmonic nanoparticles include at least first, second, and third plasmonic nanoparticles with first, second, and third distinct light-scattering spectrums.

3. The system defined in claim 2 wherein the first plasmonic nanoparticles comprise spherical metal nanoparticles.

4. The system defined in claim 3 wherein the second and third plasmonic nanoparticles comprise metal-coated-dielectric-core plasmonic nanoparticles.

5. The system defined in claim 1 wherein the second coating comprises a polymer and a colorant in the polymer.

6. The system defined in claim 5 wherein the plasmonic nanoparticles include solid metal nanoparticles and metal-coated-dielectric-core nanoparticles.

7. The system defined in claim 5 wherein the colorant comprises dye, wherein the visible-light-reflecting-and-infrared-light-transmitting layer blocks at least 70% of visible light at wavelengths of 400-700 nm, and wherein the visible-light-reflecting-and-infrared-light-transmitting layer transmits at least 90% of infrared light at wavelengths of 900-1000 nm.

8. The system defined in claim 5 wherein the colorant comprises pigment, wherein the visible-light-reflecting-and-infrared-light-transmitting layer blocks at least 70% of visible light at wavelengths of 400-700 nm, and wherein the visible-light-reflecting-and-infrared-light-transmitting layer transmits at least 90% of infrared light at wavelengths of 900-1000 nm.

9. A system, comprising:
   an infrared optical component;
   a visible-light-reflecting-and-infrared-light-transmitting layer that overlaps the infrared optical component and that includes:
      a substrate layer,
      a first coating on the substrate layer that is formed from a polymer containing plasmonic nanoparticles, and
      a second coating on the first coating, and
   vehicle structures adjacent to the visible-light-reflecting-and-infrared-light-transmitting layer that are color matched to the visible-light-reflecting-and-infrared-light-transmitting layer.

10. Apparatus, comprising:
    an infrared optical component; and a visible-light-reflecting-and-infrared-light-transmitting structure that overlaps the infrared optical component and that includes:
  an infrared-transparent support structure; and
  a layer on the infrared-transparent support structure that contains plasmonic nanoparticles and colorant, wherein the plasmonic nanoparticles are configured to reflect white light and wherein the colorant is configured to impart a color to the reflected white light.

11. The apparatus defined in claim 10 wherein the layer on the infrared-transparent support structure comprises polymer and wherein the polymer contains the plasmonic nanoparticles and the colorant.

12. The apparatus defined in claim 11 wherein the colorant comprises a colorant selected from the group consisting of: a dye and a pigment.

13. The apparatus defined in claim 12 wherein the plasmonic nanoparticles comprise solid metal nanoparticles having diameters of less than 300 nm.

14. The apparatus defined in claim 13 wherein the plasmonic nanoparticles comprise metal-coated plasmonic nanoparticles with dielectric cores.

15. The apparatus defined in claim 14 wherein the infrared optical component comprises an infrared optical component selected from the group consisting of: a lidar device, an infrared camera, and infrared light source, and an infrared camera.

16. A vehicle, comprising:
  a vehicle body;
  a support structure coupled to the vehicle body;
  an infrared camera;
  a visible-light-reflecting-and-infrared-light-transmitting layer supported by the support structure, wherein infrared light passes through the visible-light-reflecting-and-infrared-light-transmitting layer to the infrared camera and wherein the visible-light-reflecting-and-infrared-light-transmitting layer comprises:
    a polymer containing plasmonic nanoparticles that are configured to reflect white light; and
    non-black colorant that colors the visible-light-reflecting-and-infrared-light-transmitting layer by coloring the reflected white light.

17. The vehicle defined in claim 16 wherein the plasmonic nanoparticles comprise solid metal plasmonic nanoparticles having diameters of less than 300 nm.

18. The vehicle defined in claim 17 wherein the plasmonic nanoparticles include first and second metal-coated nanoparticles with dielectric cores of first and second different respective diameters.

19. The vehicle defined in claim 18 wherein the vehicle support structure comprises a portion of a vehicle dashboard.

20. The apparatus defined in claim 10, further comprising:
  vehicle structures adjacent to the visible-light-reflecting-and-infrared-light-transmitting structure that are color matched to the visible-light-reflecting-and-infrared-light-transmitting structure.

* * * * *

UNITED STATES PATENT AND TRADEMARK OFFICE
CERTIFICATE OF CORRECTION

| | |
|---|---|
| PATENT NO. | : 10,502,879 B1 |
| APPLICATION NO. | : 15/703846 |
| DATED | : December 10, 2019 |
| INVENTOR(S) | : Malcolm J. Northcott et al. |

Page 1 of 1

It is certified that error appears in the above-identified patent and that said Letters Patent is hereby corrected as shown below:

In the Claims

Column 9, Line 27, Claim 15 "infrared camera, and infrared light source, and an infrared" should read -- infrared camera, an infrared light source, and an infrared --

Signed and Sealed this
Twenty-first Day of April, 2020

Andrei Iancu
*Director of the United States Patent and Trademark Office*